(12) United States Patent
Kataoka et al.

(10) Patent No.: US 8,978,914 B2
(45) Date of Patent: Mar. 17, 2015

(54) FUEL TANK FUEL FILLER STRUCTURE

(75) Inventors: Chiaki Kataoka, Aichi-gun (JP);
Satoshi Yamamoto, Nagoya (JP);
Masaki Akagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/698,486

(22) PCT Filed: Feb. 23, 2011

(86) PCT No.: PCT/JP2011/054035
§ 371 (c)(1),
(2), (4) Date: Nov. 16, 2012

(87) PCT Pub. No.: WO2012/114484
PCT Pub. Date: Aug. 30, 2012

(65) Prior Publication Data
US 2013/0327768 A1    Dec. 12, 2013

(51) Int. Cl.
*B65D 3/00*    (2006.01)
*B60K 15/04*    (2006.01)
(52) U.S. Cl.
CPC ............. *B60K 15/0406* (2013.01); *B60K 15/04* (2013.01); *B60K 2015/0461* (2013.01)
USPC ........................................ 220/86.2; 220/825
(58) Field of Classification Search
CPC ....................................................... B60K 15/04
USPC ................ 220/86.1, 86.2, 86.3, 345.1, 345.2, 220/345.4; 141/350
See application file for complete search history.

(56) References Cited

U.S. PATENT DOCUMENTS

| 4,526,216 | A | * | 7/1985 | Lake, Jr. | 141/348 |
| 5,145,081 | A | * | 9/1992 | Gravino | 220/86.2 |
| 5,435,358 | A | * | 7/1995 | Kempka et al. | 141/312 |
| 5,465,861 | A | * | 11/1995 | Kunz et al. | 220/260 |
| 5,467,621 | A | * | 11/1995 | Gravino | 70/171 |
| 5,485,871 | A | * | 1/1996 | Romanek et al. | 141/312 |
| 5,921,297 | A | * | 7/1999 | Kremer et al. | 141/383 |
| 6,029,719 | A | * | 2/2000 | Hor et al. | 141/348 |
| 6,092,685 | A | * | 7/2000 | Gruber | 220/86.2 |
| 6,102,234 | A | * | 8/2000 | Kremer et al. | 220/86.2 |
| 6,155,316 | A | * | 12/2000 | Benjey | 141/348 |
| 6,318,423 | B1 | * | 11/2001 | Zapp et al. | 141/384 |
| 6,637,477 | B1 | * | 10/2003 | Maier | 141/350 |
| 6,691,750 | B1 | * | 2/2004 | Foltz | 141/350 |

(Continued)

FOREIGN PATENT DOCUMENTS

JP    A-2008-49952    3/2008

*Primary Examiner* — Fenn Mathew
*Assistant Examiner* — Christopher McKinley
(74) *Attorney, Agent, or Firm* — Oliff PLC

(57) ABSTRACT

To obtain a fuel tank fuel filler structure with which even a fuel nozzle having a large diameter portion can be inserted easily into a fuel fill inlet and which can highly demonstrate the action of guiding the fuel nozzle to the fuel fill inlet.
One end of a guide plate (44) is rotatably supported on a rotational shaft (42) disposed on a flapper valve (20). The guide plate (44) is biased by a guide plate biasing spring toward a withdrawal region in which the guide plate withdraws from a passage region of a fuel nozzle. In a state where the flapper valve (20) is in an open position (HP), the entire guide plate (44) is positioned in the withdrawal region. In a state where the flapper valve (20) is in a closed position (TP), the guide plate (44) can be placed near a fuel fill inlet (26).

6 Claims, 13 Drawing Sheets

(56) References Cited

U.S. PATENT DOCUMENTS

| | | | |
|---|---|---|---|
| 6,880,594 B1* | 4/2005 | Benjey | 141/350 |
| 6,994,130 B1* | 2/2006 | Gabbey et al. | 141/371 |
| 7,007,726 B1* | 3/2006 | Martin et al. | 141/350 |
| 7,182,111 B2* | 2/2007 | McClung et al. | 141/352 |
| 7,318,462 B2* | 1/2008 | Ganachaud | 141/350 |
| 7,762,291 B2* | 7/2010 | Martin et al. | 141/350 |
| 2002/0000260 A1* | 1/2002 | Palvoelgyi et al. | 141/350 |
| 2003/0089424 A1* | 5/2003 | Gabbey et al. | 141/286 |
| 2006/0060581 A1* | 3/2006 | Foltz et al. | 220/265 |
| 2006/0162813 A1* | 7/2006 | Walkowski | 141/350 |
| 2006/0237472 A1* | 10/2006 | Martin et al. | 220/812 |
| 2006/0289083 A1* | 12/2006 | Bar | 141/350 |
| 2007/0034287 A1* | 2/2007 | Groom et al. | 141/350 |
| 2010/0193076 A1* | 8/2010 | Walkowski et al. | 141/348 |

\* cited by examiner

FUEL TANK FUEL FILLER STRUCTURE

TECHNICAL FIELD

The present invention relates to a fuel tank fuel filler structure.

BACKGROUND ART

As a fuel filler structure for fueling the fuel tank of a vehicle or the like, there is a fuel filler structure configured in such a way that the fuel fill inlet, into which the fuel nozzle is inserted, can be opened and closed by an opening-and-closing valve such as a flapper valve. For example, in patent document 1 (JP-A No. 2008-49952), there is described a structure configured in such a way that an inclined surface leading from a lead-in opening to an open portion is formed in an opening forming member so as to guide the fuel nozzle to the open portion.

However, there are fuel nozzles that have a large diameter portion in the middle of their lengthwise direction, such as fuel nozzles with a structure where a helical spring is attached to the outer periphery of a tubular fuel nozzle body. It is necessary for the smallest diameter section of the inner diameter of the inclined surface (guide surface) to be given a size considering the large diameter section (spring section) in the middle of the fuel nozzle. However, when the smallest diameter section of the inclined surface is made larger, it becomes difficult for the fuel filler structure to highly demonstrate the action of guiding the distal end of the fuel nozzle to the fuel fill inlet.

DISCLOSURE OF INVENTION

Technical Problem

In consideration of the above-described circumstances, it is a problem of the present invention to obtain a fuel tank fuel filler structure with which even a fuel nozzle having a large diameter portion can be inserted easily into a fuel fill inlet and which can highly demonstrate the action of guiding the fuel nozzle to the fuel fill inlet.

Solution to Problem

In a first aspect of the present invention, a fuel tank fuel filler structure includes: a fuel fill inlet member that is equipped with a fuel fill inlet into which a fuel nozzle for fueling a fuel tank is inserted; an opening-and-closing valve that is capable of opening and closing the fuel fill inlet; a rotational member for attaching the opening-and-closing valve to the fuel fill inlet member in such a way that the opening-and-closing valve is rotatable between a closed position in which the opening-and-closing valve closes the fuel fill inlet and an open position in which the opening-and-closing valve opens the fuel fill inlet as a result of being pushed by the fuel nozzle; a guide member that guides the fuel nozzle to the opening-and-closing valve at a time of insertion of the fuel nozzle into the fuel fill inlet; and an interlock member that allows the guide member to move interlockingly with the rotation operation of the opening-and-closing valve in such a way as to enlarge an insertion region of the fuel nozzle when the opening-and-closing valve is in the open position.

In the fuel tank fuel filler structure of the first aspect, the opening-and-closing valve is rotatably attached by the rotational member with respect to the fuel fill inlet member. Normally, the fuel fill inlet is closed by the opening-and-closing valve, but at the time of insertion of the fuel nozzle into the fuel fill inlet, the opening-and-closing valve is pushed by the fuel nozzle and rotates to the open position so that the fuel fill inlet is opened. Further, at the time of insertion of the fuel nozzle into the fuel fill inlet, the fuel nozzle is guided to the opening-and-closing valve by the guide member.

The guide member is configured in such a way that it moves interlockingly, because of the interlock member, with the rotation operation of the opening-and-closing valve, and when the opening-and-closing valve is in the open position, the guide member enlarges the insertion region of the fuel nozzle. Because of this, even a fuel nozzle having a large diameter portion can be inserted easily into the fuel fill inlet compared to a configuration where the guide member does not enlarge the insertion region of the fuel nozzle.

Additionally, in this way, by allowing the guide member to move in such a way that it enlarges the insertion region of the fuel nozzle at the time of insertion of the fuel nozzle into the fuel fill inlet, in a normal state the guide member can be placed in a position near the fuel fill inlet. Consequently, the action of guiding the fuel nozzle to the opening-and-closing valve (the fuel fill inlet) becomes higher compared to a configuration where the guide member is not moved to a withdrawal region like this.

In a second aspect of the present invention, in the first aspect, with respect to a fuel nozzle where a large diameter portion is configured in the middle of its lengthwise direction, at the time of insertion, the interlock member allows the guide member to move interlockingly with the rotation operation of the opening-and-closing valve in such a way that the guide member becomes positioned in a withdrawal region withdrawn from a passage region of the large diameter portion.

In the second aspect, in this way, with respect to a fuel nozzle where a large diameter portion is configured in the middle of its lengthwise direction, the interlock member allows the guide member to move interlockingly with the rotation operation of the opening-and-closing valve in such a way that the guide member becomes positioned in the withdrawal region withdrawn from the passage region of the large diameter portion. The guide member does not interfere with the large diameter portion of the fuel nozzle when the opening-and-closing valve is in the open position, so the insertion of the fuel nozzle into the fuel fill inlet becomes even easier.

In a third aspect of the present invention, in the first or second aspect, the guide member is disposed on the opening-and-closing valve.

In the third aspect, by disposing the guide member on the opening-and-closing valve, it becomes possible to have the operation of allowing the guide member to move to the withdrawal region interlockingly with the opening-and-closing valve be performed by a simple configuration.

In a fourth aspect of the present invention, in the third aspect, the guide member has a rotational shaft that is disposed on the opening-and-closing valve in a site separated from a center of rotation of the opening-and-closing valve and a guide plate whose one end is rotatably supported on the rotational shaft, and the interlock member has a biasing member that biases the guide plate toward the withdrawal region in a state where the opening-and-closing valve is in the open position.

In the fourth aspect, the one end of the guide plate is supported by the rotational shaft in a site separated from the center of rotation of the opening-and-closing valve. When the rotational shaft reaches the withdrawal region in the open position of the opening-and-closing valve, the one end side of the guide member also moves to the withdrawal region. Further, the guide plate is biased toward the withdrawal region by the biasing member. Consequently, when the opening-and-closing valve is in the open position, the guide plate can be reliably maintained in the withdrawal region.

As the guide member, it suffices simply to dispose the rotational shaft and the guide plate, so the structure can be simplified.

In a fifth aspect of the present invention, in the fourth aspect, the fuel tank fuel filler structure further includes a sliding surface that is disposed on the fuel fill inlet member along an insertion direction of the fuel nozzle and is for allowing the guide plate biased by the biasing member to slide on the sliding surface and for returning the guide plate to an initial position in accompaniment with an operation where the opening-and-closing valve returns from the open position to the closed position.

In the fifth aspect, when the opening-and-closing valve returns from the open position to the closed position, the guide plate can slide on the sliding surface and return to the initial position (that is, a position of the guide plate in which the guide plate is capable of guiding the fuel nozzle to the opening-and-closing valve). Because the guide plate slides on the sliding surface, it becomes possible to allow the guide plate to stably move interlockingly with the rotation operation.

In a sixth aspect of the present invention, in the fifth aspect, the fuel tank fuel filler structure further includes a restricting member that restricts the guide plate from moving further outward in a radial direction than the sliding surface when the guide plate has moved further toward a far side of the fuel fill inlet than the sliding surface and has separated from the sliding surface.

In the sixth aspect, even when the guide plate moves to the far side of the fuel fill inlet and separates from the sliding surface, the guide plate is prevented by the restricting member from moving further outward in the radial direction than the sliding surface. Consequently, when the opening-and-closing valve returns from the open position to the closed position, inadvertent catching of the guide plate on the fuel fill inlet member can be prevented.

In a seventh aspect of the present invention, in the first aspect or the second aspect, the guide member is disposed on the fuel fill inlet member.

In the seventh aspect, by disposing the guide member on the fuel fill inlet member, the degree of freedom of the shape and operation of the guide member becomes higher.

Advantageous Effects of Invention

The present invention is given the above-described configurations, so even a fuel nozzle having a large diameter portion can be inserted into the fuel fill inlet, and the action of guiding the fuel nozzle to the fuel fill inlet can be highly demonstrated.

BEST MODES FOR CARRYING OUT THE INVENTION

Figure 1:
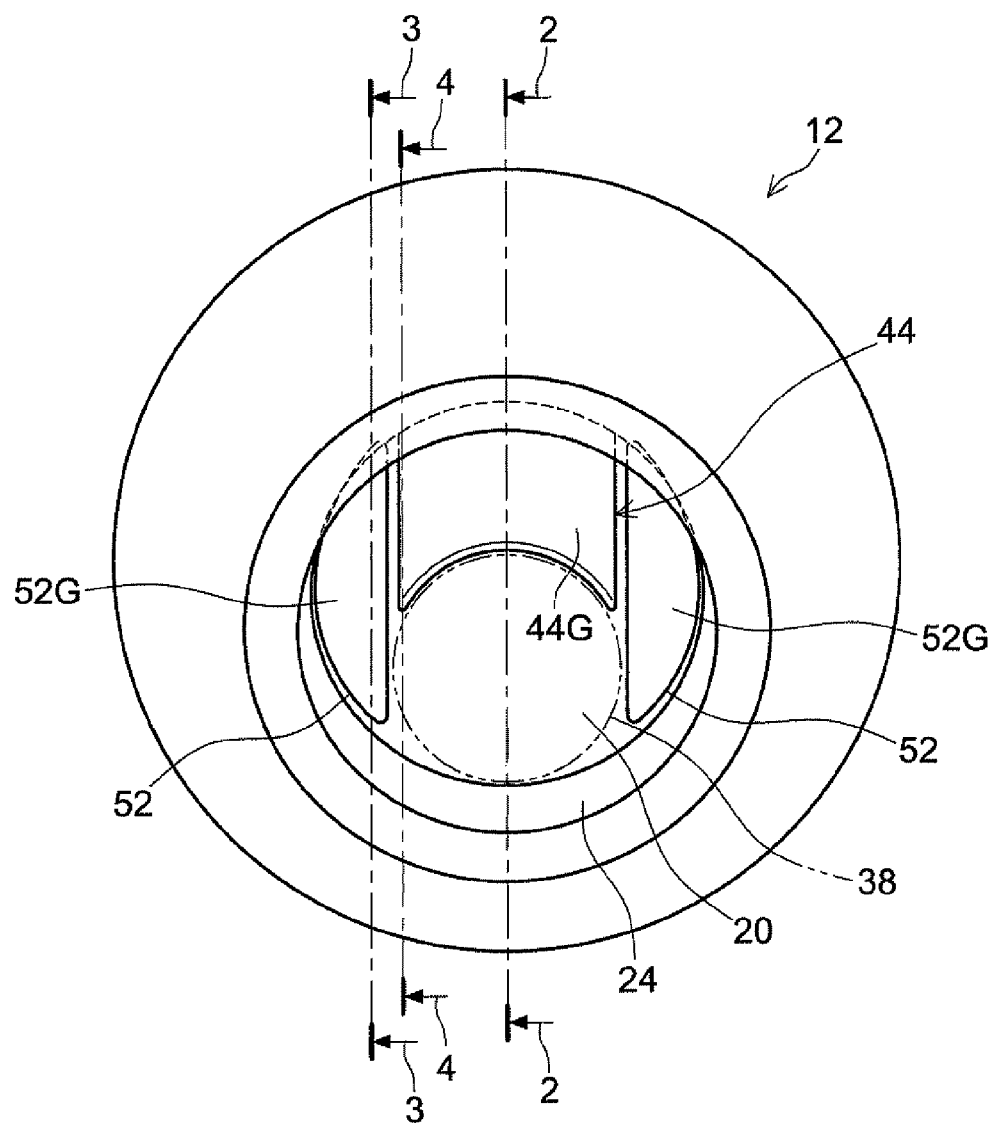
FIG. 1 is a front view shown from outside showing a fuel tank fuel filler structure of a first embodiment of the present invention.

In FIG. 1, the external shape of a fuel tank fuel filler structure (hereinafter simply called "the fuel filler structure") 12 of a first embodiment of the present invention is shown in a state seen from the front. Further, in FIG. 2 to FIG. 4, the fuel filler structure 12 is respectively shown in cross-sectional views taken along line 2-2, line 3-3, and line 4-4 in FIG. 1. As will be understood from FIG. 1, in the present embodiment, the fuel filler structure 12 has a structure where a cap for closing a fuel fill inlet is unnecessary.

Figure 6:
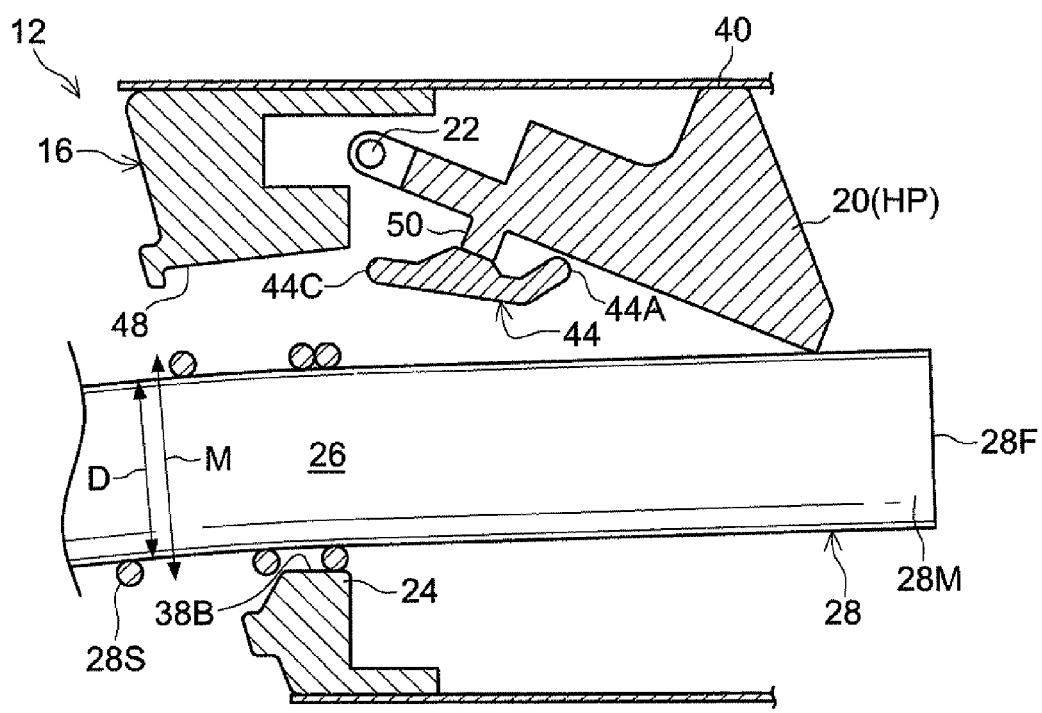
FIG. 6 is a cross-sectional view showing the fuel tank fuel filler structure of the first embodiment of the present invention in a state where the fuel nozzle is in the middle of being inserted.
Figure 7:
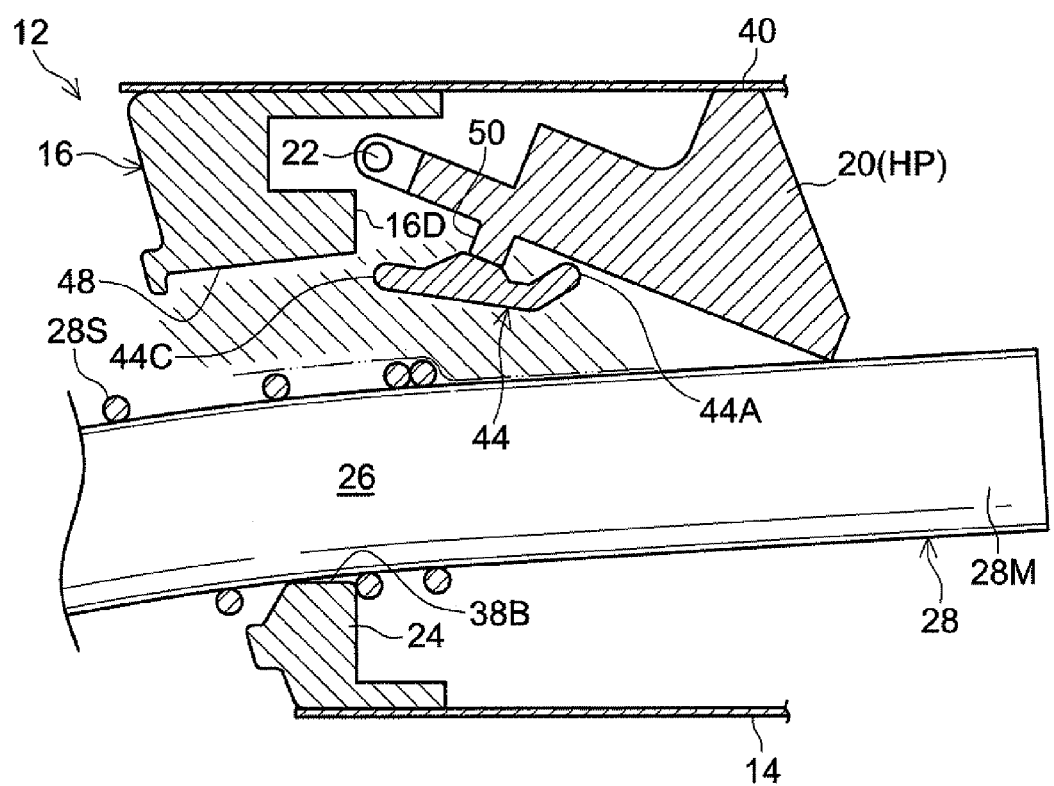
FIG. 7 is a cross-sectional view showing the fuel tank fuel filler structure of the first embodiment of the present invention in a state where the fuel nozzle has been inserted as far as a predetermined position.

Further, in the present embodiment, it is assumed that a fuel nozzle 28 for fueling the fuel tank is one with a structure where a coiled fuel nozzle spring 28S is wound onto the outer periphery of a cylindrical fuel nozzle body 28M as shown in FIG. 6 and FIG. 7. The fuel nozzle spring 28S is wound in a position a predetermined distance away from a distal end 28F of the fuel nozzle body 28M. An outer diameter M of the fuel nozzle spring 28S section is larger than an outer diameter D of the fuel nozzle body 28M. That is, the fuel nozzle 28 has, in the middle of its lengthwise direction, a large diameter portion resulting from the fuel nozzle spring 28S.

Moreover, it is assumed that the fuel nozzle 28 is a fuel nozzle corresponding to fuel with which the fuel tank is intended to be filled (hereinafter called "compatible fuel"). There are fuel tanks for gasoline, fuel tanks for light oil, and so forth, and the outer diameter of the fuel nozzle is determined in accordance with the fuel type. Consequently, the "passage region" and the "withdrawal region" described later become uniquely determined when the type of fuel contained in the fuel tank is determined.

Figure 2:
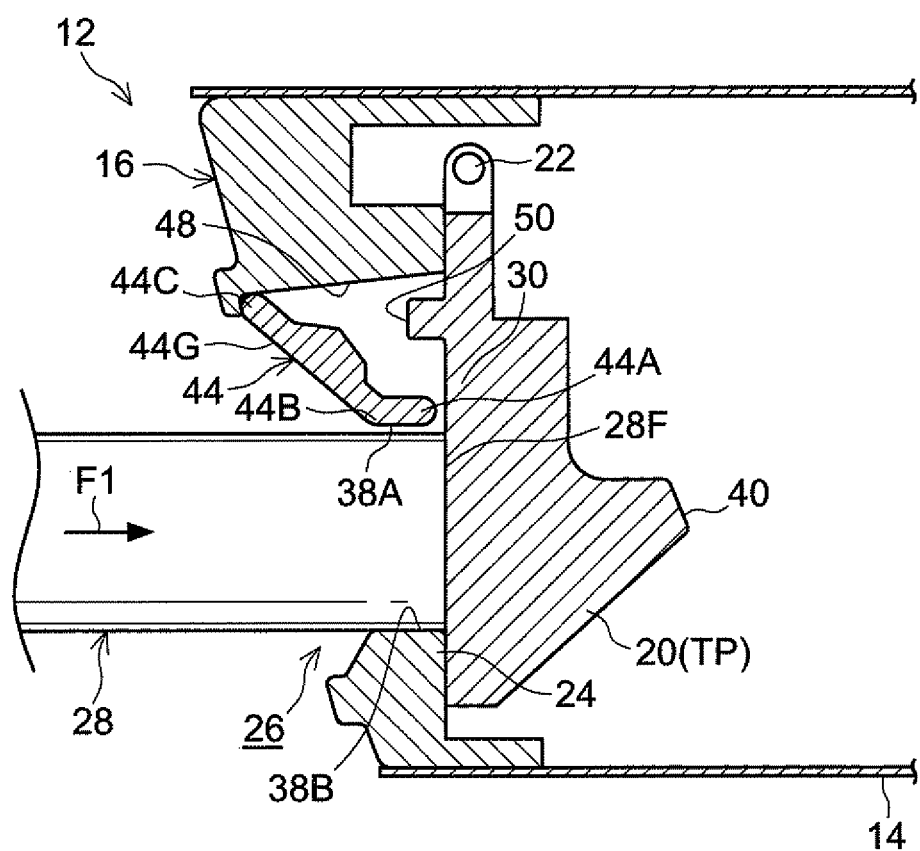
FIG. 2 is a cross-sectional view, taken along line 2-2 of FIG. 1, showing the fuel tank fuel filler structure of the first embodiment of the present invention in a state where a flapper valve is in a closed position.

The lower end of an inlet pipe 14 for fueling shown also in FIG. 2 is connected to an unillustrated fuel tank, and the fuel filler structure 12 is applied to the upper portion of the inlet pipe 14.

A substantially cylindrical fuel fill inlet member 16 is attached to the upper end of the inlet pipe 14. The interior of the fuel fill inlet member 16 is a fuel fill inlet 26. The fuel nozzle 28 can be inserted into the fuel fill inlet 26 to fuel the fuel tank.

Hereinafter, when simply referring to the "far side", this will mean the side of the fuel fill inlet member 16 near the fuel tank (the right side in FIG. 2), and when referring to the "near side", this will mean the opposite side, that is, the side from which the fuel nozzle 28 is inserted (the left side in FIG. 2). Further, when referring to the "radial direction", this will mean the radial direction of the substantially cylindrical fuel fill inlet member 16.

A catch portion 24 is disposed in the fuel fill inlet member 16 in a position below the fuel fill inlet 26 in FIG. 2. The catch portion 24 produces moderate passage resistance at the time of passage of the fuel nozzle spring 28S.

Moreover, after the fuel nozzle spring 28S has passed the catch portion 24, the catch portion 24 catches the fuel nozzle spring 28S as shown in FIG. 7 to suppress inadvertent escape of the fuel nozzle 28 from the fuel fill inlet member 16. A guide tube configuring portion 38B that is part of a guide tube portion 38 together with a later-described guide tube configuring portion 38A is formed on the inner peripheral side (inward in the radial direction) of the catch portion 24.

A flapper valve 20 is disposed inside the upper portion of the fuel fill inlet member 16 (that is, in the fuel fill inlet 26). The flapper valve 20 is rotatably attached to the fuel fill inlet member 16 by a hinge 22 disposed in the upper portion in FIG. 2. Additionally, the flapper valve 20 rotates between a closed position TP (the position shown in FIG. 2) in which the flapper valve 20 closes the fuel fill inlet 26 and an open position HP (the position shown in FIG. 6 and FIG. 7) in which the flapper valve 20 opens the fuel fill inlet 26.

In the open position HP, the lower portion of the flapper valve 20—that is, the side opposite the side where the hinge 22 is placed—greatly moves toward the fuel tank side. In the closed position TP, as will be understood from FIG. 2, the flapper valve 20 strikes the catch portion 24, and rotation of the flapper valve 20 in the direction heading toward the closed position TP is restricted.

The flapper valve 20 has a valve body portion 30 whose diameter is larger than that of the fuel fill inlet 26 and which is capable of closing the fuel fill inlet 26. An annular gasket (not illustrated) is attached to the valve body portion 30, and when the flapper valve 20 is in the closed position TP, the gasket comes into contact with the valve body portion 30 around the fuel fill inlet 26 from the far side of the fuel fill inlet member 16 to reliably close the fuel fill inlet 26.

As shown in FIG. 6, a stopper projection 40 is disposed on the back surface of the flapper valve 20. The stopper projection 40 restricts the range of rotation of the flapper valve 20 by striking the inner peripheral surface of the inlet pipe 14 or the fuel fill inlet member 16 when the flapper valve 20 is in the open position HP.

A valve or the like for regulating the pressure inside the fuel tank may be disposed as needed on the flapper valve 20.

A flapper valve spring 36 (see FIG. 3) is wound onto the hinge 22. The flapper valve spring 36 biases the flapper valve 20 toward the closed position TP (the direction of arrow R1) to ensure that the fuel fill inlet 26 is not inadvertently opened. The flapper valve 20 moves (rotates) to the open position HP counter to the biasing force of the flapper valve spring 36 when the flapper valve 20 is pushed by the fuel nozzle 28 trying to be inserted from the fuel fill inlet 26.

Figure 4:
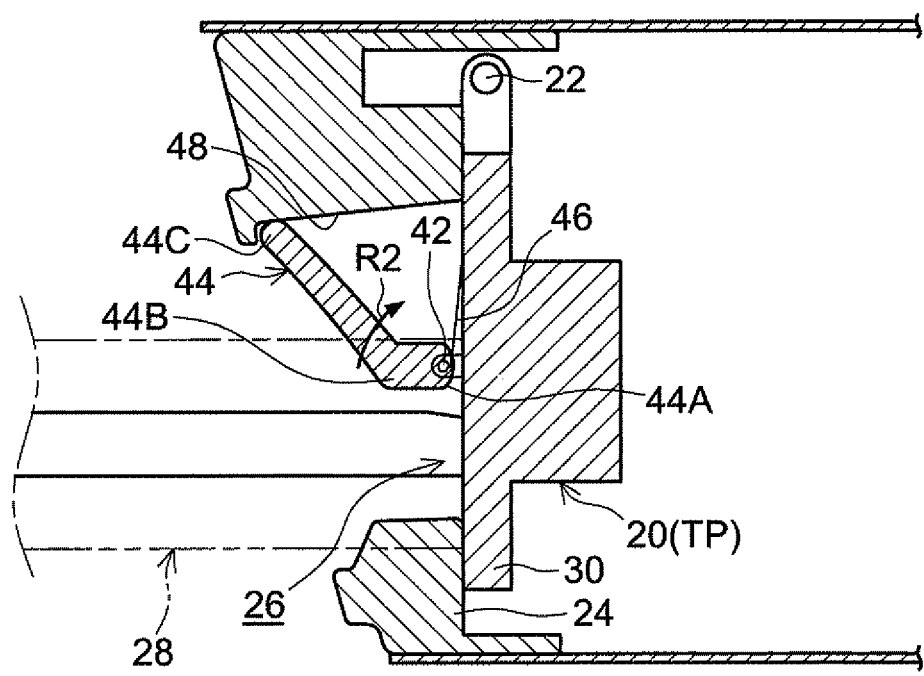
FIG. 4 is a cross-sectional view, taken along line 4-4 of FIG. 1, showing the fuel tank fuel filler structure of the first embodiment of the present invention in a state where the flapper valve is in the closed position.

As shown in FIG. 4, a rotational shaft 42 is disposed on the front surface (the surface on the near side) of the flapper valve 20. The rotational shaft 42 is placed parallel to the hinge 22.

The rotational shaft 42 is in a position separated from the hinge 22, so when the flapper valve 20 rotates from the closed position TP to the open position HP, the rotational shaft 42 moves outward in the radial direction (toward the upper side in FIG. 4) from the neighborhood of the center of the fuel fill inlet member 16. In particular, as shown in FIG. 7, the position of the rotational shaft 42 when the flapper valve 20 is in the open position HP is in a withdrawal region AE withdrawn from a passage region of the fuel nozzle 28 (in particular, the fuel nozzle spring 28S) inserted into the fuel fill inlet 26.

One end 44A of a guide plate 44 that is an example of a guide member of the present invention is rotatably supported on the rotational shaft 42.

As shown in FIG. 2, the guide plate 44 is bent at an obtuse angle midway between the one end 44A and another end 44C, whereby a bend 44B is disposed in the guide plate 44. Additionally, the guide plate 44 has, with the bend 44B serving as a divider, a guide tube configuring portion 38A on the one end 44A side and an inclined guide portion 44B on the other end 44C side. The guide member of the present invention does not have to be formed in a plate shape and may also, for example, be a block-shaped member.

A guide plate biasing spring 46 is attached to the rotational shaft 42 and biases the guide plate 44 in the direction of arrow R2, that is, toward the withdrawal region AE.

A sliding surface 48 is formed on the fuel fill inlet member 16 on the near side of the hinge 22 (the side opposite the fuel tank). The other end 44C of the guide plate 44 receiving the biasing force of the guide plate biasing spring 46 is in contact with the sliding surface 48.

The guide plate 44 is in an initial position when the flapper valve 20 is in the closed position. TP. In this initial position, the inclined guide portion 44G of the guide plate 44 gradually inclines in a direction approaching the center of the fuel fill inlet 26. The inclined guide portion 44G has the action of guiding the fuel nozzle 28 toward the flapper valve 20 closing the fuel fill inlet 26 when the distal end 28F of the fuel nozzle 28 comes into contact with the inclined guide portion 44G when the fuel nozzle 28 is inserted into the fuel fill inlet 26.

The guide tube configuring portion 38A of the guide plate 44 configures, in the initial position (when the flapper valve 20 is in the closed position TP), part of the guide tube portion 38 as shown in FIG. 1. The lower portion (one section) of the guide tube portion 38 is configured by the guide tube configuring portion 38B. Additionally, a region (an "insertion region" pertaining to the present invention) for inserting the fuel nozzle 20 into the fuel fill inlet 26 is configured between the guide tube configuring portion 38A and the guide tube configuring portion 38B.

Figure 5:
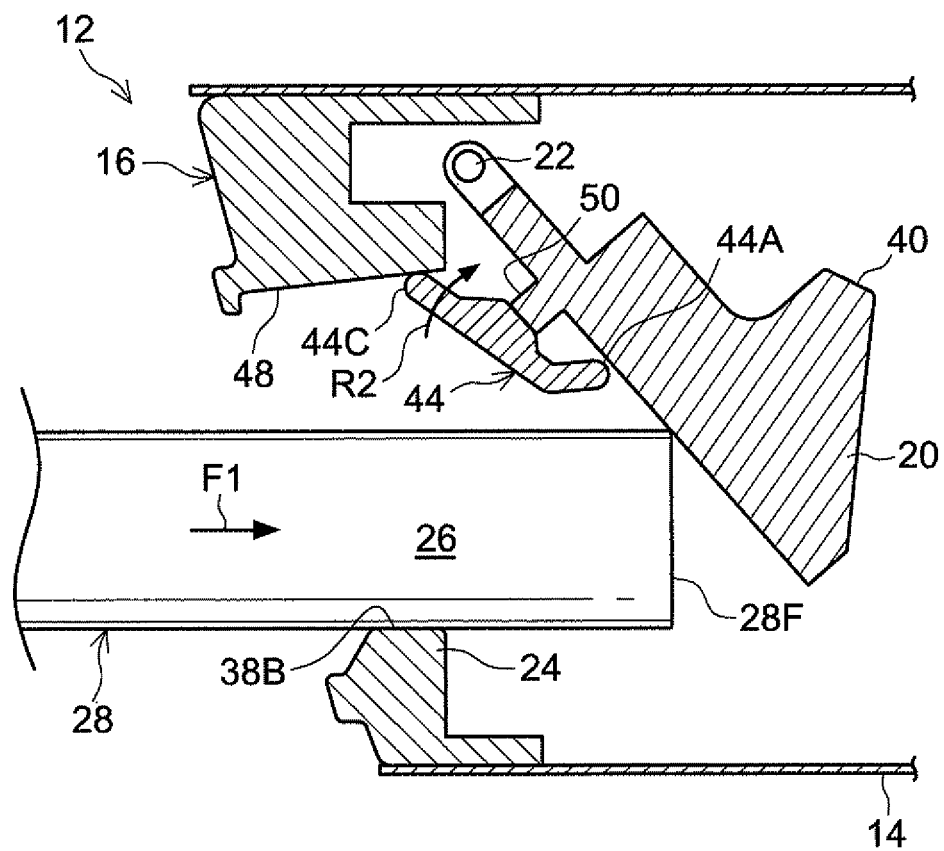
FIG. 5 is a cross-sectional view showing the fuel tank fuel filler structure of the first embodiment of the present invention in a state where a fuel nozzle is in the middle of being inserted.

As shown in FIG. 5, when the flapper valve 20 rotates between the closed position TP and the open position HP, the guide plate 44 slides while maintaining a state where the other end 44C is in contact with the sliding surface 48, and the entire guide plate 44 slides while rotating toward the far side (the fuel tank side).

Further, when the flapper valve 20 returns from the open position HP to the closed position TP, the sliding surface 48 has the action of allowing, in accompaniment with this operation, the other end 44C of the guide plate 44 to slide on the sliding surface 48 to thereby return the guide plate 44 to the initial position (the position shown in FIG. 2).

The sliding surface 48 is formed in a position in which the other end 44C side of the guide plate 44 becomes positioned in the withdrawal region AE as shown in FIG. 7 at least when the flapper valve 20 is in the open position HP. In particular, in the present embodiment, as will be understood from FIG. 5 to FIG. 7, the position of the sliding surface 48 is determined in such a way that the other end 44C side of the guide plate 44 is positioned in the withdrawal region AE while the flapper valve 20 is in the middle of moving from the closed position TP to the open position HP. When the guide plate 44 is positioned in the withdrawal region AE, the region for inserting the fuel nozzle 20 into the fuel fill inlet 26 (the "insertion region" pertaining to the present invention) becomes enlarged in the radial direction.

Figure 8A:
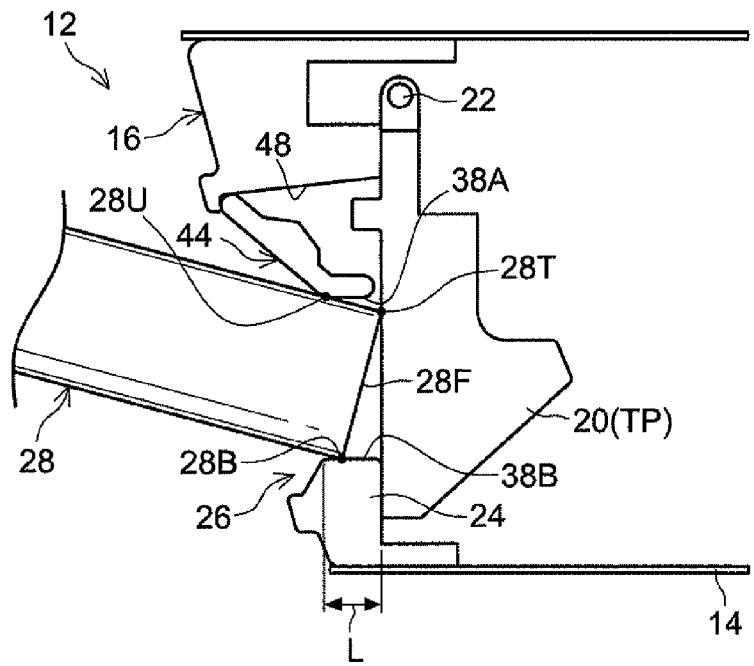
FIG. 8A is an explanatory view showing the relationship between a guide tube portion in the fuel tank fuel filler structure and the fuel nozzle.
Figure 8B:
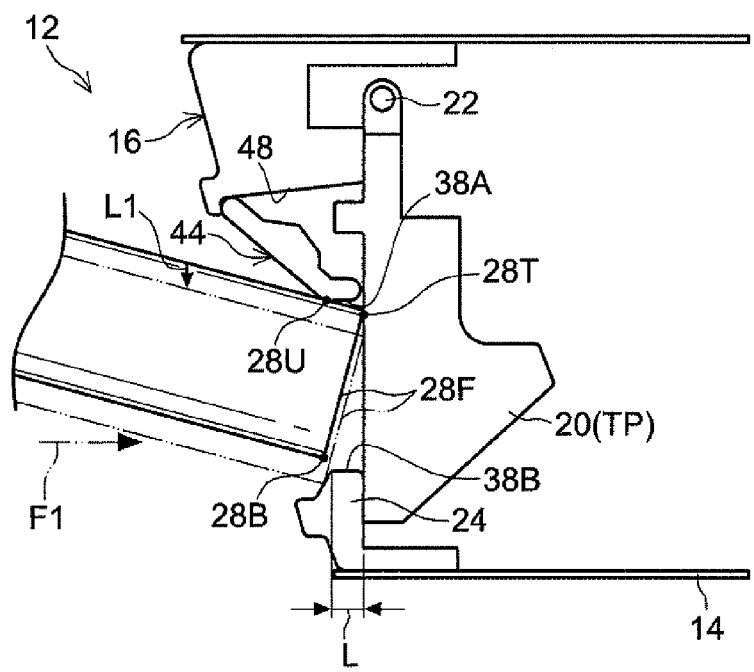
FIG. 8B is an explanatory view showing the relationship between the guide tube portion in the fuel tank fuel filler structure and the fuel nozzle.
Figure 9:
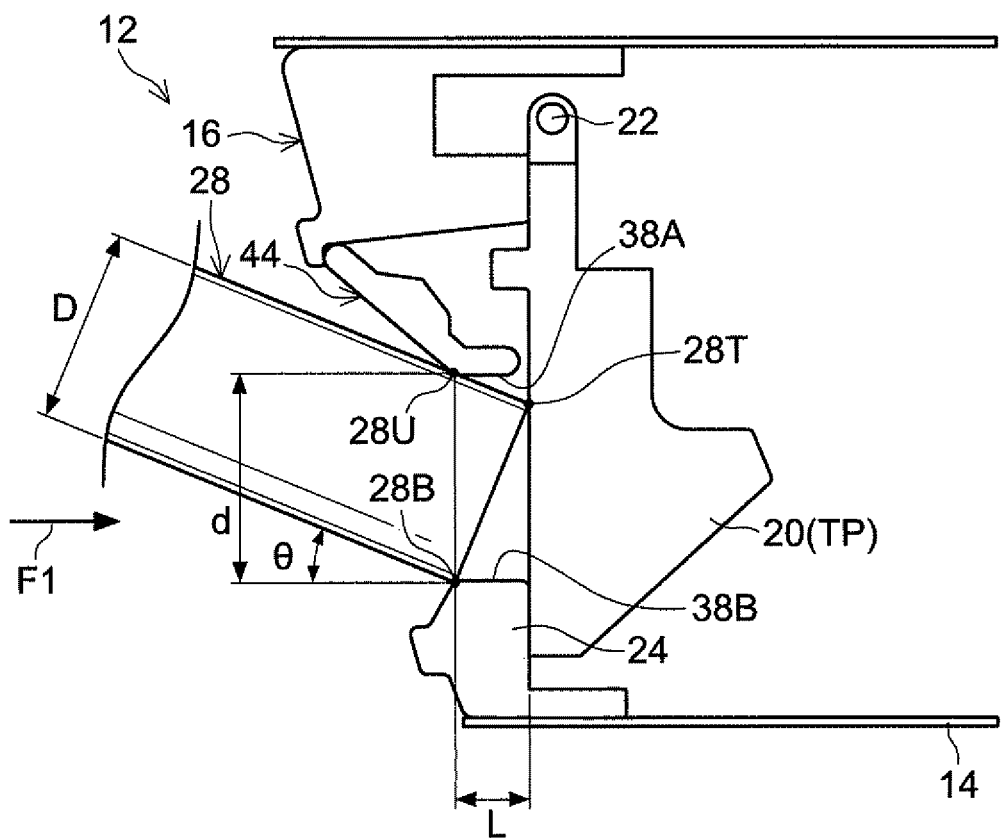
FIG. 9 is an explanatory view showing the relationship between the guide tube portion in the fuel tank fuel filler structure and the fuel nozzle.

In particular, in the present embodiment, as shown in detail in FIG. 8A, FIG. 8B, and FIG. 9, the length (depth) of the guide tube configuring portions 38A and 38B is given a predetermined length L in terms of its relationship with the outer diameter D of the fuel nozzle body 28M (regarding D, d, and L, see also FIG. 9). The predetermined length L is determined in such a way that, when the fuel nozzle 28 is inserted into the fuel fill inlet 26, the distal end of the fuel nozzle 28 can be positioned so that it does not inadvertently move in the radial direction even in a case where the fuel nozzle 28 has tried to be inserted diagonally, for example. In FIG. 8A, FIG. 8B, and FIG. 9, for convenience of illustration, hatched lines representing cross sections are not drawn.

A case will be considered where, as shown in FIG. 8B, the fuel nozzle 28 is put up diagonally to the fuel fill inlet 26. At this time, if the length L of the guide tube portion 38 is short, a distal end top portion 28T of the fuel nozzle 28 comes into contact with the flapper valve 20 and part of an upper edge portion 28U comes into contact with the guide tube configuring portion 38A (strictly speaking, the bend 44B).

In this state, the fuel nozzle 28 is capable of sliding along the flapper valve 20 in the closed position TP and moving in the down direction (the direction of arrow L1) in FIG. 8B. Additionally, due to this movement of the fuel nozzle 28, as indicated by the two-dotted chain line in FIG. 8B, sometimes a distal end bottom portion 28B of the fuel nozzle 28 ends up moving lower than the guide tube configuring portion 38B. In this case, even if the fuel nozzle 28 is moved in the direction of arrow F1, the distal end 28F of the fuel nozzle 28 ends up striking the lower side section of the fuel fill inlet member 16, so the fuel nozzle 28 cannot be inserted into the fuel fill inlet 26.

In contrast, as shown in FIG. 8A, if the length L of the guide tube portion 38 is long, even when the fuel nozzle 28 is put up diagonally to the fuel fill inlet 26, the distal end 28F of the fuel nozzle 28 enters the inside of the guide cylinder portion 38, and the distal end bottom portion 28B of the fuel nozzle 28 comes into contact with the guide tube configuring portion 38B. Because of this, movement of the fuel nozzle 28 in the down direction is inhibited, and the fuel nozzle 28 can be positioned.

FIG. 9 is an explanatory view for deciding the condition of the length L for positioning the fuel nozzle 28 in the radial direction in this way. In FIG. 9, θ represents an inclination angle of the fuel nozzle 28 from the insertion direction (the direction of arrow F1).

Here, a right triangle RT configured by the points (part of the upper edge portion 28U, the distal end top portion 28T, and the distal end bottom portion 28B) at which the fuel nozzle 28 contacts the guide tube configuring portions 38A and 38B and the flapper valve 20 will be considered.

In this right triangle RT, $\cos(\theta)=D/d$, that is, $\theta=\cos^{-1}(D/d)$ (1).

Further, $L=D\cdot\sin(\theta)$, so substituting (1) results in $L=D\cdot\sin(\cos^{-1}(D/d))$. That is, as long as the condition of the length L of the guide tube portion 38 is $L\geq D\cdot\sin(\cos^{-1}(D/d))$, the distal end 28F of the fuel nozzle 28 inserted diagonally into the fuel fill inlet 26 can be positioned in such a way that it does not inadvertently move in the radial direction.

As shown in FIG. 2, a rotation restricting projection 50 that is an example of a restricting member of the present invention is formed on the flapper valve 20 in a position between the hinge 22 and the rotational shaft 42. The rotation restricting projection 50 comes into contact with the guide plate 44 and restricts the rotation of the guide plate 44 in the direction of arrow R2 when the flapper valve 20 reaches the open position HP as shown in FIG. 6 and FIG. 7 (or is in the middle of reaching the open position HP as shown in FIG. 5).

As will be understood from FIG. 7, when the flapper valve 20 becomes positioned in the open position HP, even when the other end 44C of the guide plate 44 moves further toward the far side than the sliding surface 48 and separates from the sliding surface 48, the rotation of the guide plate 44 outward in the radial direction (the direction of arrow R2) is restricted as a result of the guide plate 44 striking the rotation restricting projection 50. For this reason, when the flapper valve 50 returns from the open position HP to the closed position TP, the guide plate 44 smoothly returns to the sliding state on the sliding surface 48 without getting caught on a step section 16D of the fuel fill inlet member 16. In other words, even when the opening of the flapper valve 20 is made larger, it becomes possible to reliably allow the guide plate 44 to return to the sliding surface 48.

It is also possible to dispose the rotation restricting projection 50 on the guide plate 44 or the fuel fill inlet member 16 rather than on the flapper valve 20.

Figure 3:
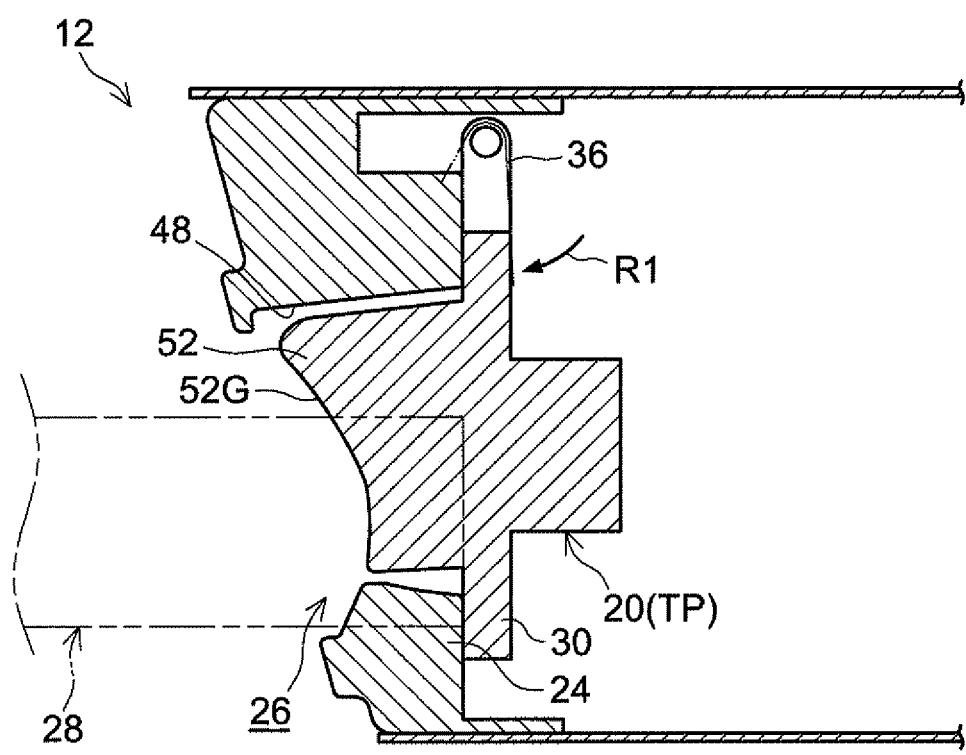
FIG. 3 is a cross-sectional view, taken along line 3-3 of FIG. 1, showing the fuel tank fuel filler structure of the first embodiment of the present invention in a state where the flapper valve is in the closed position.

As shown in FIG. 1 and FIG. 3, a pair of guide blocks 52 are formed, heading from the flapper valve 20 toward the near side, in positions on both sides of the guide plate 44 when the fuel filler structure 12 is seen in a front view. Surfaces of the guide blocks 52 on the near side are guide surfaces 52G that curve in such a way that their center sections become recessed toward the far side. The guide surfaces 52G guide the distal end 28F of the fuel nozzle 28 toward the center of the fuel fill inlet 26 when the distal end 28F comes into contact with the guide surfaces 52G at the time of insertion of the fuel nozzle 28 into the fuel fill inlet 26.

Next, the action of the fuel filler structure 12 of the present embodiment will be described.

In a normal state, as shown in FIG. 1 and FIG. 2, the flapper valve 20 is in the closed position TP and the fuel fill inlet 26 is closed.

In a case where the fuel tank is to be fueled with fuel from the fuel nozzle 28, the flapper valve 20 is pushed by the fuel nozzle 28 and caused to rotate to the open position HP. That is, first, as shown in FIG. 2, the fuel nozzle 28 is moved in the direction of arrow F1 so that the distal end 28F is put up to the fuel fill inlet 26. At this time, even if the distal end 28F of the fuel nozzle 28 comes into contact with the inclined guide portion 44G, the distal end 28F of the fuel nozzle 28 is guided (in a diagonal direction) toward the fuel fill inlet 26 because of the inclination of the inclined guide surface 44G.

When the distal end 28F of the fuel nozzle 28 enters the interior of the guide tube portion 38, inadvertent movement of the fuel nozzle 28 in the radial direction is inhibited because the length L of the guide tube portion 38 is set sufficiently long as described above. In particular, not just in a case where the fuel nozzle 28 has been inserted without being inclined into the fuel fill inlet 26 as shown in FIG. 2 but even in a case where the fuel nozzle 28 has been inserted while being inclined as shown in FIG. 8A, movement of the fuel nozzle 28 in the down direction is inhibited and the fuel nozzle 28 can be inserted in a positioned state because the length L of the guide tube portion 38 is sufficiently long.

When the fuel nozzle 28 is further moved in the direction of arrow F1, as shown in FIG. 5, the flapper valve 20 is pushed by the fuel nozzle 28 and starts to rotate toward the open position HP. Because of this, the one end 44A side of the guide plate 44 moves toward the far side of the fuel fill inlet 26 together with the rotational shaft 42. The guide plate 44 is biased in the direction of arrow R2 by the guide plate biasing spring 46, so the other end 44C of the guide plate 44 moves (slides) toward the far side of the fuel fill inlet 26 while maintaining a state of contact with the sliding surface 48. Then, while the flapper valve 20 is in the middle of rotating, the guide plate 33 strikes the rotation restricting projection 50.

When the fuel nozzle 28 is moved deeper (in the direction of arrow F1) into the fuel fill inlet 26, as shown in FIG. 6, the fuel nozzle spring 28S tries to cross over the catch portion 24, so moderate resistance arises in the movement of the fuel nozzle 28 in the direction of arrow F1. At this time, the flapper valve 20 reaches the open position HP. In the open position HP, the stopper projection 40 strikes the inner peripheral surface of the inlet pipe 14 or the fuel fill inlet member 16, and the rotation of the flapper valve 20 is restricted.

Then, as shown in FIG. 7, when the fuel nozzle 28 is inserted even more deeply and reaches a predetermined position for fueling the fuel tank, the fuel nozzle spring 28S catches on the catch portion 24. Fueling of the fuel tank is possible because the fuel nozzle 28 is inserted in the predetermined position in the fuel fill inlet 26.

When the fuel nozzle 28 is pulled out from the fuel fill inlet 26, the flapper valve 20 receives the biasing force of the flapper valve spring 36, rotates, and returns from the open position HP to the closed position TP. Further, when the flapper valve 20 returns from the open position HP to the closed position TP, in accompaniment with this operation the other end 44C of the guide plate 44 slides on the sliding surface 48 and the guide plate 44 returns to the initial position (the position shown in FIG. 2). That is, because the sliding surface 38 is disposed, it becomes possible to stably return the guide plate 44 to the initial position interlockingly with the operation where the flapper valve 20 returns to the closed position TP from the open position HP.

As will be understood from the above description, in the fuel tank fuel filler structure 12 of the present embodiment, the entire guide plate 44 is positioned in the withdrawal region AE starting from when the flapper valve 20 is in the middle of reaching the open position HP. Consequently, the guide plate 44 does not inadvertently interfere with the fuel nozzle 28 inserted into the fuel fill inlet 26, and smooth insertion of the fuel nozzle 28 into the fuel fill inlet 26 becomes possible. In particular, even when the fuel nozzle 28 is the fuel nozzle 28 where the fuel nozzle spring 28S is wound onto the fuel nozzle body 28M such that there locally exists a section whose outer diameter is large, insertion into the fuel fill inlet 26 becomes possible.

Moreover, in the present embodiment, at the time of insertion of the fuel nozzle 28 into the fuel nozzle inlet 26, the guide plate 44 is allowed to withdraw as described above, so when the flapper valve 20 is in the closed position TP, the guide plate 44 can be positioned in a position near the fuel nozzle 28 that will be inserted (a position near the center in the radial direction). Because of this, it becomes possible for the action of guiding the fuel nozzle 28 to the fuel fill inlet 26 (the flapper valve 20) to be highly demonstrated compared to a configuration where the guide plate 44 is not moved to the withdrawal region AE like this.

When the fuel nozzle 28 is to be pulled out from the fuel fill inlet 26, it suffices to move the fuel nozzle 28 in the opposite direction of arrow F1. The rotation of the guide plate 44 in the direction of arrow R2 is restricted by the rotation restricting projection 50, and the other end 44C of the guide plate 44 does not get caught on the step section 16D, so the guide plate 44 smoothly comes into contact with the sliding surface 48 and returns to the sliding state. Of course, when there is no concern that the guide plate 44 will get caught on the step section 16D even without restricting the rotation of the guide plate 44, the fuel filler structure may also have a configuration where the rotation restricting projection 50 is not disposed.

Figure 10A:
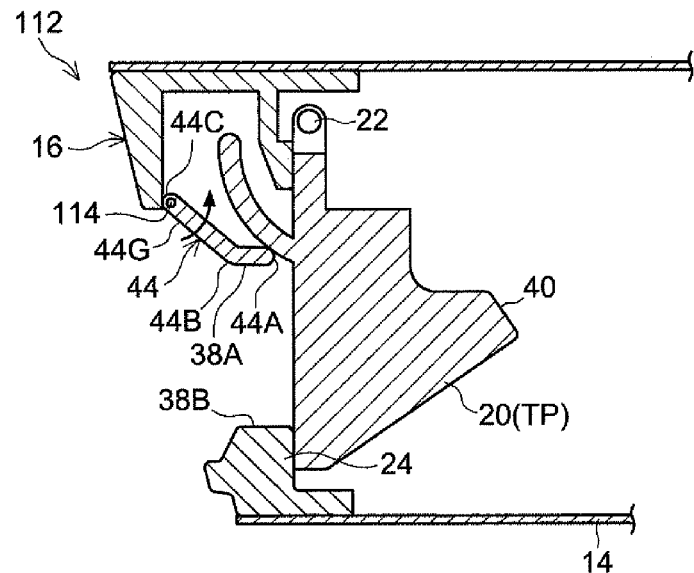
FIG. 10A is a cross-sectional view showing a fuel tank fuel filler structure of a second embodiment of the present invention in a state where the flapper valve is in the closed position.
Figure 10B:
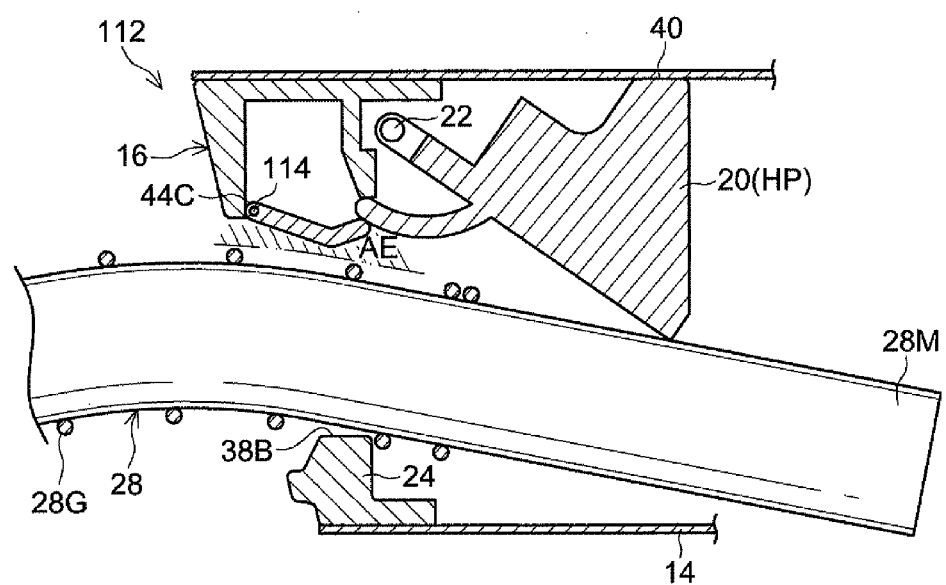
FIG. 10B a cross-sectional view showing the fuel tank fuel filler structure of the second embodiment of the present invention in a state where the fuel nozzle has been inserted as far as the predetermined position.

In FIG. 10A and FIG. 10B, a fuel filler structure 112 of a second embodiment of the present invention is shown. In the second embodiment, regarding configural elements, members, and so forth that are identical to those in the first embodiment, identical reference signs will be given thereto and detailed description thereof will be omitted.

In the second embodiment, a rotational shaft 114 of the guide plate 44 is disposed on the fuel fill inlet member 16 on the near side of the flapper valve 20. The rotational shaft 114 is placed parallel to the hinge 22 of the flapper valve 20, and the other end 44C of the guide plate 44 is rotatably supported on the rotational shaft 114. As for the position of the rotational shaft 114, the rotational shaft 114 is in a position in which the other end 44C of the guide plate 44 exists in the withdrawal region AE. A guide plate biasing spring 116 is attached to the rotational shaft 114 and biases the guide plate 44 in the direction of arrow R3.

An arm portion 118 is disposed extending from the surface of the flapper valve 20 on the near side. The arm portion 118 has a shape that curves so as to surround the hinge 22 but whose distance from the hinge 22 gradually decreases (gradually comes closer to the hinge 22) from a base portion 118A to a distal end portion 118B. The one end 44A of the guide plate 44 biased by the guide plate biasing spring 116 is in contact with the arm portion 118 from the side opposite the hinge 22.

The shape of the arm portion 118 is such that, when the flapper valve 20 is in the closed position TP, the inclined guide surface 44G of the guide plate 44 is inclined in such a way as to head toward the center of the fuel fill inlet 26 as it heads toward the fuel fill inlet 26. Moreover, the shape of the arm portion 118 is such that, when the flapper valve 20 is in the open position (where the one end 44A of the guide plate 44 is in contact at least with the distal end portion 118B), the entire guide plate 44 is positioned in the withdrawal region AE.

In the fuel fill inlet structure 112 of the second embodiment given the above configuration, as shown in FIG. 10A, when the flapper valve 20 is in the closed position TP, the one end 44A of the guide plate 44 biased in the direction of arrow R3 by the guide plate biasing spring 116 is in contact with the neighborhood of the base portion 118A of the arm portion 118. The distal end 28F of the fuel nozzle 28 can be guided by the inclined guide portion 44G of the guide plate 44 to the flapper valve 20 closing the fuel fill inlet 26.

When the flapper valve 20 is pushed by the fuel nozzle 28 and rotates toward the open position HP, both the one end of the guide plate 44 and the position where it contacts the arm portion 118 move toward the distal end side of the arm portion 118. The guide plate 44 rotates in the direction of arrow R3 because the distance of the arm portion 118 from the hinge 22 gradually decreases from the base portion 118A toward the distal end portion 118B. Then, as shown in FIG. 10B, in a state where the flapper valve 20 has reached the open position HP (or is in the middle of reaching the open position HP), the entire guide plate 44 is positioned in the withdrawal region AE. For this reason, it becomes possible to insert the fuel nozzle 28 (in particular, the fuel nozzle 28 onto which the fuel nozzle spring 28S is wound such that there locally exists a section whose outer diameter is large) into the fuel fill inlet 26.

Additionally, when the flapper valve 20 is in the closed position TP, the guide plate 44 is positioned in a position near the fuel nozzle 28 that will be inserted, whereby it becomes possible for the action of guiding the fuel nozzle 28 to the flapper valve 20 closing the fuel fill inlet 26 to be highly demonstrated.

Figure 11A:
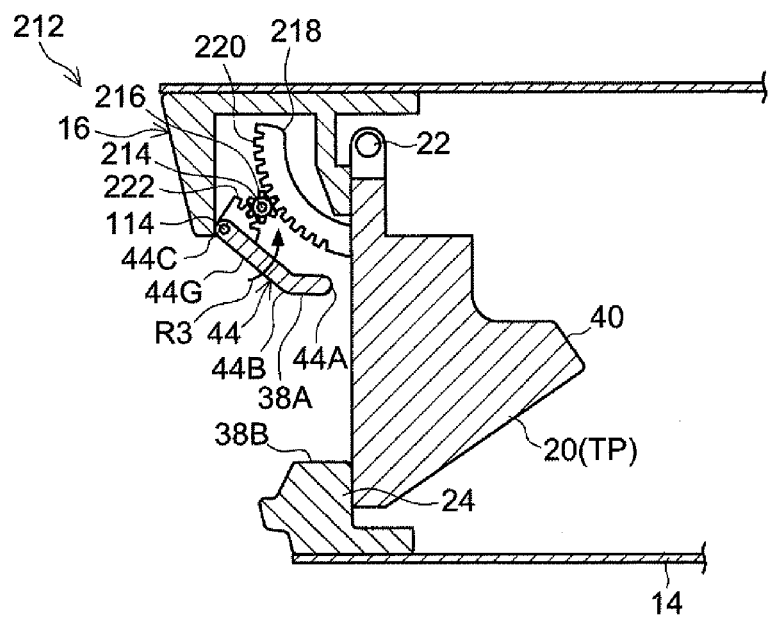
FIG. 11A is a cross-sectional view showing a fuel tank fuel filler structure of a third embodiment of the present invention in a state where the flapper valve is in the closed position.
Figure 11B:
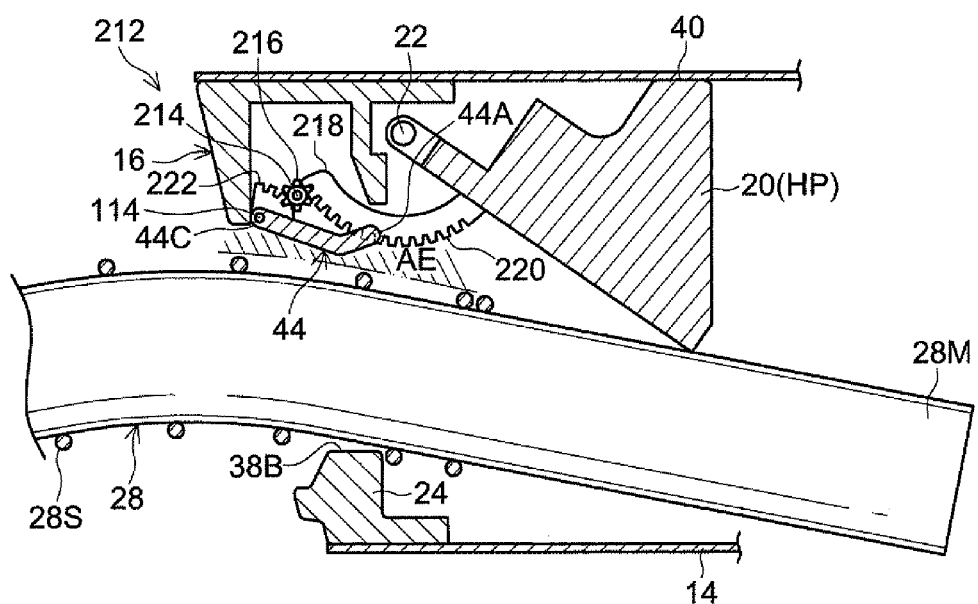
FIG. 11B a cross-sectional view showing the fuel tank fuel filler structure of the third embodiment of the present invention in a state where the fuel nozzle has been inserted as far as the predetermined position.

In FIG. 11A and FIG. 11B, a fuel filler structure 212 of a third embodiment of the present invention is shown. In the third embodiment also, regarding configural elements, members, and so forth that are identical to those in the first and second embodiments, identical reference signs will be given thereto and detailed description thereof will be omitted.

In the third embodiment, a rotational shaft 214 is disposed on the fuel fill inlet member 16 on the near side of the flapper valve 20. The rotational shaft 214 is placed parallel to the hinge 22 of the flapper valve 20, and a gear 216 is rotatably supported on the rotational shaft 214.

An arm portion 218 is disposed extending from the surface of the flapper valve 20 on the near side. In contrast to the arm portion 118 of the second embodiment, the arm portion 218 is curved in a circular arc shape having a constant radius from the hinge 22. A gear 220 is formed on the surface of the arm portion 218 on the side opposite the hinge 22. The gear 220 meshes with the gear 216.

Further, the same rotational shaft 114 as in the second embodiment is disposed on the fuel fill inlet member 16. The other end 44C of the guide plate 44 is rotatably supported on the rotational shaft 114. A gear 222 that rotates about the rotational shaft 114 is disposed integrally with the guide plate 44 on the other end of the guide plate 44. The gear 222 meshes with the gear 216. Consequently, when the flapper valve 20 rotates from the closed position TP to the open position HP, the guide plate 44 is rotated in the direction of arrow R3 via the gears 220, 216, and 222.

The positions and shapes of the gears 216, 220, and 222 are such that, when the flapper valve 20 is in the closed position TP, the inclined guide portion 44G of the guide plate 44 is inclined toward the center of the fuel fill inlet 26, and when the flapper valve 20 is in the open position, the entire guide plate 44 is positioned in the withdrawal region AR In the fuel fill inlet structure 212 of the third embodiment given the above configuration also, as shown in FIG. 11A, when the flapper valve 20 is in the closed position TP, the distal end 28F of the fuel nozzle 28 can be guided by the inclined guide portion 44G of the guide plate 44 to the flapper valve 20 closing the fuel fill inlet 26.

When the flapper valve 20 is pushed by the fuel nozzle 28 and rotates toward the open position HP, the guide plate 44 rotates in the direction of arrow R3 via the gears 220, 216, and 222.

As shown in FIG. 11B, when the flapper valve 20 reaches the open position HP, the entire guide plate 44 is positioned in the withdrawal region AE. For this reason, it becomes possible to insert the fuel nozzle 28 (in particular, the fuel nozzle 28 onto which the fuel nozzle spring 28S is wound such that there locally exists a section whose outer diameter is large) into the fuel fill inlet 26.

When the flapper valve 20 is in the closed position TP, the guide plate 44 is positioned in a position near the fuel nozzle 28 that will be inserted, whereby it becomes possible for the action of guiding the fuel nozzle 28 to the flapper valve 20 closing the fuel fill inlet 26 to be highly demonstrated.

Figure 12A:
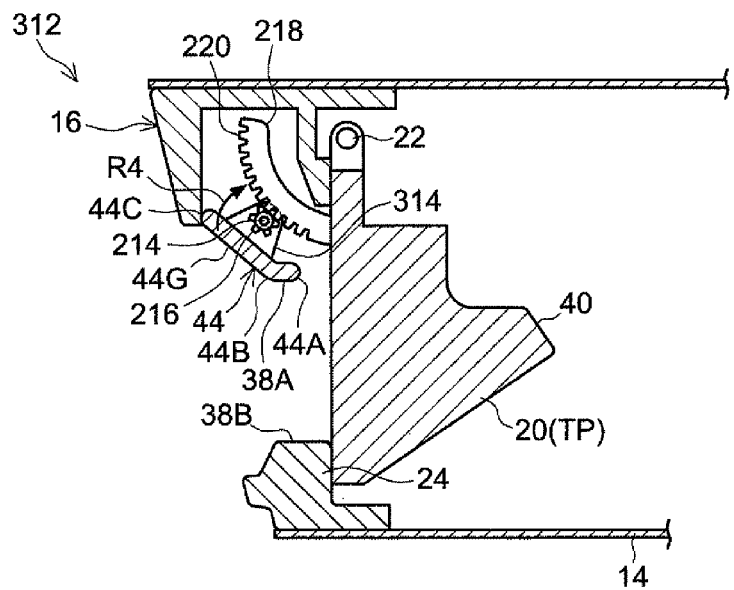
FIG. 12A is a cross-sectional view showing a fuel tank fuel filler structure of a fourth embodiment of the present invention in a state where the flapper valve is in the closed position.
Figure 12B:
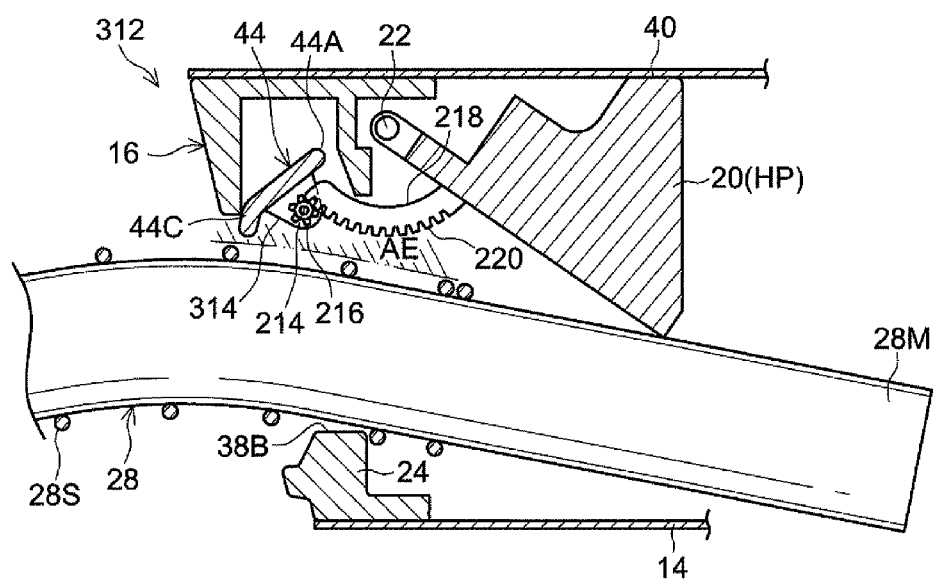
FIG. 12B a cross-sectional view showing the fuel tank fuel filler structure of the fourth embodiment of the present invention in a state where the fuel nozzle has been inserted as far as the predetermined position.

In FIG. 12A and FIG. 12B, a fuel filler structure 312 of a fourth embodiment of the present invention is shown. In the fourth embodiment also, regarding configural elements, members, and so forth that are identical to those in the first to third embodiments, identical reference signs will be given thereto and detailed description thereof will be omitted.

In the fourth embodiment, a substantially fan-shaped coupling plate 314 is supported on the rotational shaft 214. The coupling plate 314 rotates integrally with the gear 220. The guide plate 44 is fixed to the distal end side (the side away from the rotational shaft 214) of the coupling plate 314.

The position of the rotational shaft 214 and the shape of the coupling plate 314 are such that, when the flapper valve 20 is in the closed position TP, the inclined guide portion 44G of the guide plate 44 is inclined toward the center of the fuel fill inlet 26, and when the flapper valve 20 is in the open position, the entire guide plate 44 is positioned in the withdrawal region AE.

In the fuel fill inlet structure 312 of the fourth embodiment given the above configuration also, as shown in FIG. 12A, when the flapper valve 20 is in the closed position TP, the distal end 28F of the fuel nozzle 28 can be guided by the inclined guide portion 44G of the guide plate 44 to the flapper valve 20 closing the fuel fill inlet 26.

When the flapper valve 20 is pushed by the fuel nozzle 28 and rotates toward the open position HP, the guide plate 44 rotates in the direction of arrow R4 via the gears 220 and 216.

As shown in FIG. 12B, when the flapper valve 20 reaches the open position HP, the entire guide plate 44 is positioned in the withdrawal region AE. For this reason, it becomes possible to insert the fuel nozzle 28 (in particular, the fuel nozzle 28 onto which the fuel nozzle spring 28S is wound such that there locally exists a section whose outer diameter is large) into the fuel fill inlet 26.

When the flapper valve 20 is in the closed position TP, the guide plate 44 is positioned in a position near the fuel nozzle 28 that will be inserted, whereby it becomes possible for the action of guiding the fuel nozzle 28 to the flapper valve 20 closing the fuel fill inlet 26 to be highly demonstrated.

Figure 13A:
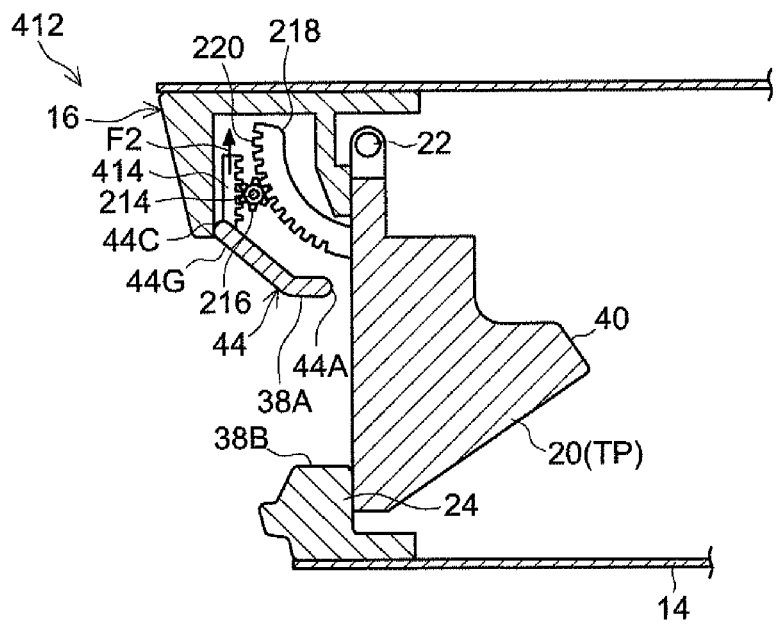
FIG. 13A is a cross-sectional view showing a fuel tank fuel filler structure of a fifth embodiment of the present invention in a state where the flapper valve is in the closed position.
Figure 13B:
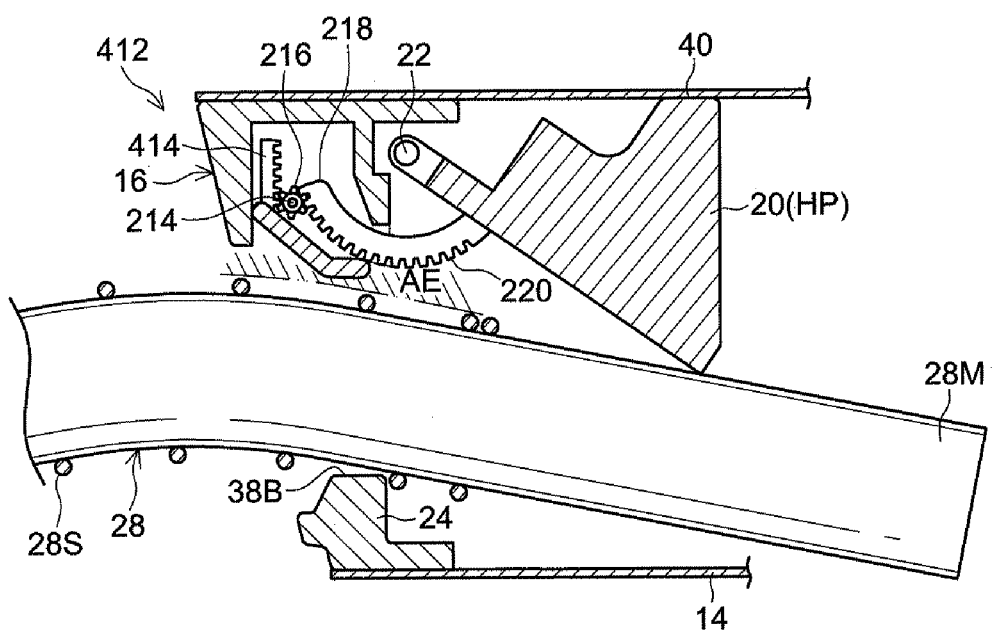
FIG. 13B a cross-sectional view showing the fuel tank fuel filler structure of the fifth embodiment of the present invention in a state where the fuel nozzle has been inserted as far as the predetermined position.

In FIG. 13A and FIG. 13B, a fuel filler structure 412 of a fifth embodiment of the present invention is shown. In the fifth embodiment also, regarding configural elements, members, and so forth that are identical to those in the first to fourth embodiments, identical reference signs will be given thereto and detailed description thereof will be omitted.

In the fifth embodiment, a rack 414 is supported by an unillustrated support rail on the fuel fill inlet member 16. The rack 414 is placed along the radial direction of the fuel fill inlet member 16 (the direction of arrow F2), and the support rail slidably supports the rack 414.

The rack 414 meshes with the gear 216. Consequently, when the flapper valve 20 rotates from the closed position TP to the open position HP, the rack 414 is moved outward in the radial direction (the direction of arrow F2) via the gears 220 and 216.

The other end 44C of the guide plate 44 is fixed to the radial direction inside end portion of the rack 414. The positions and shapes of the gear 216 (the rotational shaft 214) and the rack 414 such that, when the flapper valve 20 is in the closed position TP, the inclined guide portion 44G of the guide plate 44 is inclined toward the center of the fuel fill inlet 26, and when the flapper valve 20 is in the open position, the entire guide plate 44 is positioned in the withdrawal region AE.

In the fuel fill inlet structure 412 of the fifth embodiment given the above configuration also, as shown in FIG. 13A, when the flapper valve 20 is in the closed position TP, the fuel nozzle 28 can be guided by the inclined guide portion 44G of the guide plate 44 to the flapper valve 20 closing the fuel fill inlet 26.

When the flapper valve 20 is pushed by the fuel nozzle 28 and rotates toward the open position HP, the rack 414 is slid outward in the radial direction via the gears 220 and 216, and the guide plate 44 also moves outward in the radial direction.

As shown in FIG. 13B, when the flapper valve 20 reaches the open position HP, the entire guide plate 44 is positioned in the withdrawal region AE. For this reason, it becomes possible to insert the fuel nozzle 28 (in particular, the fuel nozzle 28 onto which the fuel nozzle spring 28S is wound such that there locally exists a section whose outer diameter is large) into the fuel fill inlet 26.

When the flapper valve 20 is in the closed position TP, the guide plate 44 is positioned in a position near the fuel nozzle 28 that will be inserted, whereby it becomes possible for the action of guiding the fuel nozzle 28 to the flapper valve 20 to be highly demonstrated.

As described above, the rotational shaft 42 and the guide plate 44 configuring the guide member are disposed on the flapper valve 20. In contrast, in the second to fifth embodiments, the rotational shaft 42 and the guide plate 44 configuring the guide member are disposed on the fuel fill inlet member 16. When the guide member is disposed on the flapper valve 20 like in the first embodiment, the guide member can be configured by a simple structure.

In particular, in the first embodiment, the rotational shaft 42 is set in a position separated from the hinge 22 of the flapper valve 20, and the position of the rotational shaft 42 moves outward in the radial direction in accompaniment with the movement of the flapper valve 20 from the closed position TP to the open position HP. This movement of the rotational shaft 42 can be utilized to move the guide plate 44 to the withdrawal region AE.

Moreover, in the first embodiment, the biasing force of the guide plate biasing spring 46 is utilized to push the other end 44C of the guide plate 44 against the sliding surface 48 and position the other end 44C in the withdrawal region AE. That is, as an interlock member of the present invention, it substantially suffices to form the sliding surface 48 on the fuel fill inlet member 16, so the structure becomes simple.

Examples where the guide member (the guide plate 44) is disposed on the flapper valve 20 are not limited to the above example described as the first embodiment. For example, a link mechanism may be disposed on the flapper valve 20, and the guide plate 44 may be supported by this link mechanism in such a way that the guide plate 44 is positioned in the withdrawal region AE when the flapper valve 20 is positioned in the open position HP. Even with this kind of configuration, the fuel fill inlet member 16 has a simple structure.

In the second to fifth embodiments, the guide plate 44 that is the guide member is disposed on the fuel fill inlet member 16, and the rotational shafts 114 and 214 and so forth are also disposed on the fuel fill inlet member 16. Because of this, the shape and operation of the guide plate 44 can be set in a variety of ways, and the degree of freedom becomes higher. In other words, because the guide member is disposed on the fuel fill inlet member 16, the various configurations of the second to fifth embodiments become possible.

The invention claimed is:

1. A fuel tank fuel filler structure comprising:
    a fuel fill inlet member that is equipped with a fuel fill inlet into which a fuel nozzle for fueling a fuel tank is inserted;
    an opening-and-closing valve that is capable of opening and closing the fuel fill inlet;
    a rotational member for attaching the opening-and-closing valve to the fuel fill inlet member in such a way that the opening-and-closing valve is rotatable between a closed position in which the opening-and-closing valve closes the fuel fill inlet and an open position in which the opening-and-closing valve opens the fuel fill inlet as a result of being pushed by the fuel nozzle;
    a guide member that is attached rotatably to the fuel fill inlet member or the opening-and-closing valve and that guides the fuel nozzle to the opening-and-closing valve at a time of insertion of the fuel nozzle into the fuel fill inlet; and
    an interlock member that allows the guide member to move interlockingly with the rotation operation of the opening-and-closing valve in such a way as to enlarge an insertion region of the fuel nozzle when the opening-and-closing valve is in the open position,
    wherein with respect to a fuel nozzle where a large diameter portion is configured in the middle of its lengthwise direction, at the time of insertion, the interlock member allows the guide member to move interlockingly with the rotation operation of the opening-and-closing valve in such a way that the guide member becomes positioned in a withdrawal region withdrawn from a passage region of the large diameter portion.

2. The fuel tank fuel filler structure according to claim 1, wherein
    the guide member has
        a rotational shaft that is disposed on the opening-and-closing valve in a site separated from a center of rotation of the opening-and-closing valve and
        a guide plate whose one end is rotatably supported on the rotational shaft, and
    the interlock member has a biasing member that biases the guide plate toward the withdrawal region in a state where the opening-and-closing valve is in the open position.

3. The fuel tank fuel filler structure according to claim 2, further comprising a sliding surface that is disposed on the fuel fill inlet member along an insertion direction of the fuel nozzle and is for allowing the guide plate biased by the biasing member to slide on the sliding surface and for returning the guide plate to an initial position in accompaniment with an operation where the opening-and-closing valve returns from the open position to the closed position.

4. The fuel tank fuel filler structure according to claim 3, further comprising a restricting member that restricts the guide plate from moving further outward in a radial direction than the sliding surface when the guide plate has moved further toward a far side of the fuel fill inlet than the sliding surface and has separated from the sliding surface.

5. A fuel tank fuel filler structure comprising:
a fuel fill inlet member that is equipped with a fuel fill inlet into which a fuel nozzle for fueling a fuel tank is inserted;
an opening-and-closing valve that is capable of opening and closing the fuel fill inlet;
a rotational member for attaching the opening-and-closing valve to the fuel fill inlet member in such a way that the opening-and-closing valve is rotatable between a closed position in which the opening-and-closing valve closes the fuel fill inlet and an open position in which the opening-and-closing valve opens the fuel fill inlet as a result of being pushed by the fuel nozzle;
a guide member that is attached rotatably to the fuel fill inlet member or the opening-and-closing valve and that guides the fuel nozzle to the opening-and-closing valve at a time of insertion of the fuel nozzle into the fuel fill inlet; and
an interlock member that allows the guide member to move interlockingly with the rotation operation of the opening-and-closing valve in such a way as to enlarge an insertion region of the fuel nozzle when the opening-and-closing valve is in the open position,
wherein with respect to a fuel nozzle where a large diameter portion is configured in the middle of its lengthwise direction, at the time of insertion, the interlock member allows the guide member to move interlockingly with the rotation operation of the opening-and-closing valve in such a way that the guide member becomes positioned in a withdrawal region withdrawn from a passage region of the large diameter portion, and
the guide member is disposed on the opening-and-closing valve.

6. A fuel tank fuel filler structure comprising:
a fuel fill inlet member that is equipped with a fuel fill inlet into which a fuel nozzle for fueling a fuel tank is inserted;
an opening-and-closing valve that is capable of opening and closing the fuel fill inlet;
a rotational member for attaching the opening-and-closing valve to the fuel fill inlet member in such a way that the opening-and-closing valve is rotatable between a closed position in which the opening-and-closing valve closes the fuel fill inlet and an open position in which the opening-and-closing valve opens the fuel fill inlet as a result of being pushed by the fuel nozzle;
a guide member that is attached rotatably to the fuel fill inlet member or the opening-and-closing valve and that guides the fuel nozzle to the opening-and-closing valve at a time of insertion of the fuel nozzle into the fuel fill inlet; and
an interlock member that allows the guide member to move interlockingly with the rotation operation of the opening-and-closing valve in such a way as to enlarge an insertion region of the fuel nozzle when the opening-and-closing valve is in the open position,
wherein with respect to a fuel nozzle where a large diameter portion is configured in the middle of its lengthwise direction, at the time of insertion, the interlock member allows the guide member to move interlockingly with the rotation operation of the opening-and-closing valve in such a way that the guide member becomes positioned in a withdrawal region withdrawn from a passage region of the large diameter portion, and
the guide member is disposed on the fuel fill inlet member.

* * * * *